US012559618B2

(12) United States Patent　　　(10) Patent No.:　US 12,559,618 B2
Kim et al.　　　　　　　　　　　　(45) Date of Patent:　　Feb. 24, 2026

(54) THERMOPLASTIC RESIN COMPOSITION AND MOLDED PRODUCT MANUFACTURED THEREFROM

(71) Applicant: LOTTE CHEMICAL CORPORATION, Seoul (KR)

(72) Inventors: In-Chol Kim, Uiwang-si (KR);
Hyeongseob Shin, Uiwang-si (KR);
Keehae Kwon, Uiwang-si (KR);
Jaekeun Hong, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 973 days.

(21) Appl. No.: 17/772,696

(22) PCT Filed: Oct. 28, 2020

(86) PCT No.: PCT/KR2020/014785
§ 371 (c)(1),
(2) Date: Apr. 28, 2022

(87) PCT Pub. No.: WO2021/086001
PCT Pub. Date: May 6, 2021

(65) Prior Publication Data
US 2023/0039123 A1　　Feb. 9, 2023

(30) Foreign Application Priority Data
Oct. 31, 2019　(KR) ........................ 10-2019-0138167

(51) Int. Cl.
*C08L 51/04* 　　　(2006.01)
*C08L 33/06* 　　　(2006.01)
*C08L 35/06* 　　　(2006.01)

(52) U.S. Cl.
CPC .............. *C08L 51/04* (2013.01); *C08L 33/06* (2013.01); *C08L 35/06* (2013.01); *C08L 2205/03* (2013.01)

(58) Field of Classification Search
CPC .... C08L 2205/03; C08L 51/003; C08L 35/02; C08L 33/06; C08L 51/04; C08L 51/03
See application file for complete search history.

(56) References Cited

U.S. PATENT DOCUMENTS

| | | |
|---|---|---|
| 5,155,190 A | 10/1992 | Okinaka |
| 5,998,556 A | 12/1999 | Kanto et al. |
| 2014/0011959 A1 | 1/2014 | Takaki |
| 2014/0107276 A1 | 4/2014 | Kim et al. |
| 2014/0235749 A1 | 8/2014 | Kim et al. |
| 2016/0340505 A1 | 11/2016 | Kim et al. |

| | | |
|---|---|---|
| 2017/0031058 A1 | 2/2017 | Kitayama et al. |
| 2018/0265690 A1 | 9/2018 | Kim et al. |
| 2021/0061984 A1 | 3/2021 | Shin et al. |

FOREIGN PATENT DOCUMENTS

| | | | |
|---|---|---|---|
| CN | 104962022 A | | 10/2015 |
| EP | 0794201 B1 | | 11/2003 |
| JP | 2017114990 A | * | 6/2017 |
| KR | 10-2006-0115271 A | | 11/2006 |
| KR | 10-2007-0092884 A | | 9/2007 |
| KR | 10-2010-0002408 A | | 1/2010 |
| KR | 10-0962368 B1 | | 6/2010 |
| KR | 10-2011-0056080 A | | 5/2011 |
| KR | 10-2012-0042802 A | | 5/2012 |
| KR | 10-1214647 B1 | | 12/2012 |
| KR | 10-2013-0046162 A | | 5/2013 |
| KR | 10-2013-0057795 A | | 6/2013 |
| KR | 10-1285494 B1 | | 7/2013 |
| KR | 10-2014-0027872 A | | 3/2014 |
| KR | 10-2015-0066647 A | | 6/2015 |
| KR | 10-2015-0067573 A | | 6/2015 |
| KR | 10-2015-0072095 A | | 6/2015 |
| KR | 10-2016-0061628 A | | 6/2016 |
| KR | 10-2017-0062984 A | | 6/2017 |
| KR | 10-1800086 B1 | | 11/2017 |
| KR | 10-1840345 B1 | | 3/2018 |
| KR | 10-2018-0073062 A | | 7/2018 |
| KR | 10-1886887 B1 | | 8/2018 |
| KR | 10-2019-0052798 A | | 5/2019 |
| KR | 20190052798 A | * | 5/2019 |
| KR | 10-2019-0082087 A | | 7/2019 |
| KR | 10-2010376 B1 | | 8/2019 |
| WO | 2011/129596 A2 | | 10/2011 |
| WO | 2019/132304 A2 | | 7/2019 |
| WO | 2021/086001 A1 | | 5/2021 |

OTHER PUBLICATIONS

Extended Search Report in counterpart European Application No. 20881743.7 dated Nov. 7, 2023, pp. 1-9.
Anonymous : "Polyimilex (TM) : Products : Nippon Shokubai" , Oct. 27, 2023 (Oct. 27, 2023), XP093095976, Retrieved from the Internet : URL: https://www.shokubai.co.jp/en/products/detail/polyimilex/ [retrieved on Oct. 27, 2023] p. 1-p. 2.
International Search Report in counterpart International Application No. PCT/KR2020/014785 dated Feb. 3, 2021, pp. 1-6.

* cited by examiner

*Primary Examiner* — Mark S Kaucher
(74) *Attorney, Agent, or Firm* — Additon, Pendleton & Witherspoon, P.A.

(57) ABSTRACT

Provided are a thermoplastic resin composition and a molded product manufactured therefrom, the thermoplastic resin composition including (A) 10 to 40 wt % of an acrylic graft copolymer that includes a core including an acrylic rubbery polymer, and a shell formed by graft polymerization of a monomer to the core, the monomer including an alkyl (meth)acrylate, an aromatic vinyl compound, a vinyl cyanide compound, or a combination thereof; (B) 30 to 60 wt % of a polyalkyl (meth)acrylate resin; and (C) 10 to 40 wt % of an N-(substituted)maleimide-acrylic copolymer.

17 Claims, No Drawings

THERMOPLASTIC RESIN COMPOSITION AND MOLDED PRODUCT MANUFACTURED THEREFROM

CROSS-REFERENCE TO RELATED APPLICATIONS

This application claims priority to and the benefit of International Application No. PCT/KR2020/014785, filed Oct. 28, 2020, which published as WO 2021/086001 on May 6, 2021, and Korean Patent Application No. 10-2019-0138167, filed in the Korean Intellectual Property Office on Oct. 31, 2019, the entire disclosure of each of which is incorporated herein by reference.

TECHNICAL FIELD

A thermoplastic resin composition and a molded product manufactured therefrom.

BACKGROUND ART

Recently, thermoplastic resins, which are widely applied to electric and electronic products, automobiles, construction materials, leisure products, and the like, have been rapidly replacing existing glass or metal products. Accordingly, there is an increasing demand for a thermoplastic resin capable of realizing excellent impact resistance, weather resistance, molding processability, and high-quality appearance.

In general, when an acrylonitrile-butadiene-styrene copolymer resin (hereinafter, ABS resin) as the thermoplastic resin is used, the ABS resin includes a chemically unstable double bond in a rubber component, which may be easily aged by ultraviolet (UV) rays, and thus exhibits insufficient weather resistance and light resistance. Accordingly, when left outdoors for a long time, the ABS resin exhibits significant discoloring and property deterioration over time and thus may not be suitable for outdoor uses when exposed to sunlight.

On the contrary, an acrylonitrile-styrene-acrylate copolymer resin (hereinafter, ASA resin) uses a chemically stable acrylic rubbery polymer instead of the butadiene-based rubbery polymer as the rubber component, and thus is known as an alternative capable of solving the discoloring and property deterioration problems of the ABS resin according to aging of rubber component due to the ultraviolet (UV) rays. In addition, the ASA resin has excellent moldability, chemical resistance, thermal stability, and the like as well as weather resistance and light resistance.

In accordance with the recent eco-friendly trend, a demand for unpainted thermoplastic resins used without a painting process is increasing. The unpainted thermoplastic resins should have excellent scratch resistance, coloring properties, impact resistance, weather resistance, and the like, for molded products made by using the same are used without painting as they are, and in addition, as a demand level of physical properties has been recently increased, attempts to apply ASA/PMMA alloy resins prepared by mixing the ASA resin with a poly(methyl methacrylate) resin (hereinafter, PMMA resin) are increasing.

However, the ASA/PMMA alloy resins lack impact resistance and heat resistance, compared with the ASA resins, and in particular, when general heat resistance enhancers are used to compensate for the heat resistance, the coloring properties of the ASA/PMMA alloy resins may be greatly reduced due to the low compatibility with ASA and/or PMMA.

Therefore, there is a need for research on ASA/PMMA alloy resins having excellent impact resistance, heat resistance and coloring properties.

DISCLOSURE

Description of the Drawings

Technical Problem

A thermoplastic resin composition capable of implementing an ASA/PMMA alloy resin having excellent impact resistance, heat resistance, and coloring properties is provided.

Another embodiment provides a molded product manufactured from the thermoplastic resin composition.

Technical Solution

According to an embodiment, a thermoplastic resin composition includes (A) 10 to 40 wt % of an acrylic graft copolymer that includes a core including an acrylic rubbery polymer, and a shell formed by graft polymerization of a monomer to the core, the monomer including an alkyl (meth)acrylate, an aromatic vinyl compound, a vinyl cyanide compound, or a combination thereof; (B) 30 to 60 wt % of a polyalkyl (meth)acrylate resin; and (C) 10 to 40 wt % of an N-(substituted)maleimide-acrylic copolymer.

The acrylic rubbery polymer may have an average particle diameter of 200 to 400 nm.

The acrylic rubbery polymer may be included in an amount of 20 to 60 wt % based on 100 wt % of the (A) acrylic graft copolymer.

The acrylic rubbery polymer may include a crosslinked polymer of an alkyl acrylate monomer comprising methyl acrylate, ethyl acrylate, butyl acrylate, 2-ethylhexyl acrylate, hexyl acrylate, or a combination thereof, a crosslinked copolymer of the alkyl acrylate monomer and a styrene monomer, or a combination thereof.

The core may include an alkyl acrylate-styrene-based crosslinked copolymer, and the shell may be formed by graft polymerization of the monomer including the alkyl (meth) acrylate to the core.

The core may include an alkyl acrylate crosslinked polymer, and the shell may be formed by graft polymerization of a monomer mixture including the aromatic vinyl compound and the vinyl cyanide compound to the core.

The shell may be a copolymer of a monomer mixture including the aromatic vinyl compound and the vinyl cyanide compound in a weight ratio of 5:5 to 8:2.

The (B) polyalkyl (meth)acrylate resin may have a weight average molecular weight of 10,000 to 200,000 g/mol.

The (B) polyalkyl (meth)acrylate resin may be a polymer of a monomer including methyl (meth)acrylate, ethyl (meth) acrylate, butyl (meth)acrylate, glycidyl (meth)acrylate, 2-hydroxyethyl (meth)acrylate, cyclohexyl (meth)acrylate, or a combination thereof.

The (C) N-(substituted)maleimide-acrylic copolymer may have a glass transition temperature of 120 to 160° C.

The (C) N-(substituted)maleimide-acrylic copolymer may have a refractive index of 1.490 to 1.580.

The (C) N-(substituted)maleimide-acrylic copolymer may be a terpolymer of N-(substituted)maleimide-alkyl (meth)acrylate-aromatic vinyl compound.

The N-(substituted)maleimide may include N-methylmaleimide, N-ethylmaleimide, N-cyclohexylmaleimide, N-phenylmaleimide, or a combination thereof.

The (C) N-(substituted)maleimide-acrylic copolymer may have a weight average molecular weight of 10,000 to 300,000 g/mol.

The thermoplastic resin composition may further include (D) alkyl (meth)acrylate-aromatic vinyl compound-vinyl cyanide compound copolymer in an amount of greater than 0 wt % and less than or equal to 20 wt %.

The thermoplastic resin composition may further include at least one additive selected from a flame retardant, a nucleating agent, a coupling agent, a filler, a plasticizer, a lubricant, an antibacterial agent, a release agent, a heat stabilizer, an antioxidant, an inorganic additive, an ultraviolet stabilizer, an antistatic agent, a pigment, and a dye.

On the other hand, according to another embodiment, a molded product manufactured from the aforementioned thermoplastic resin composition is provided.

The molded product may have a notched Izod impact strength of a ¼ inch-thick specimen measured according to ASTM D256 of greater than or equal to 4 kgf·cm/cm.

The molded product may have a Vicat softening temperature measured according to ASTM D1525 of greater than or equal to 101° C.

The molded product may have a lightness value (L*) measured according to ASTM E308 in a specular component excluded (SCE) method with respect to a black molded product of less than or equal to 3.

Advantageous Effects

A thermoplastic resin composition having improved impact resistance, heat resistance, and coloring properties, and a molded product manufactured therefrom may be provided.

MODE FOR INVENTION

Hereinafter, embodiments of the present invention are described in detail. However, these embodiments are exemplary, the present invention is not limited thereto and the present invention is defined by the scope of claims.

In the present specification, "(meth)acrylate" means acrylate and/or methacrylate.

In the present specification, unless otherwise mentioned, the average particle diameter means a Z-average particle diameter measured using a dynamic light scattering analyzer.

In the present specification, unless otherwise mentioned, the weight average molecular weight is measured by dissolving a powder sample in tetrahydrofuran (THF) and then performing gel permeation chromatography (GPC) with a 1200 series made by Agilent Technologies Inc. (a column is LF-804 made by Shodex and a standard sample is polystyrene made by Shodex).

An embodiment provides a thermoplastic resin composition having improved impact resistance, heat resistance, and coloring properties.

The thermoplastic resin composition may include (A) 10 to 40 wt % of an acrylic graft copolymer that comprises a core including an acrylic rubbery polymer, and a shell formed by graft polymerization of a monomer to the core, the monomer including an alkyl (meth)acrylate, an aromatic vinyl compound, a vinyl cyanide compound, or a combination thereof; (B) 30 to 60 wt % of a polyalkyl (meth)acrylate resin; and (C) 10 to 40 wt % of an N-(substituted)maleimide-acrylic copolymer.

Hereinafter, each component included in the thermoplastic resin composition will be described in detail.

(A) Acrylic Graft Copolymer

In an embodiment, the acrylic graft copolymer may be prepared by graft polymerization of a monomer and/or a monomer mixture including a predetermined compound to a core including an acrylic rubbery polymer to form a shell.

The polymerization method may use a conventional preparing method, for example emulsion polymerization, suspension polymerization, solution polymerization, bulk polymerization, and the like. As a non-limiting example, it may be prepared by a method of preparing a core formed of one or more layers of an acrylic rubbery polymer, and performing graft polymerization of the aforementioned monomer and/or monomer mixture to the core to form a shell of one or more layers.

The acrylic rubbery polymer may be a crosslinked polymer prepared by using an alkyl acrylate monomer as a main monomer. Examples of the alkyl acrylate monomer may include methyl acrylate, ethyl acrylate, butyl acrylate, 2-ethylhexyl acrylate, hexyl acrylate, or a combination thereof.

The alkyl acrylate monomer may be copolymerized with one or more other radically polymerizable monomers (e.g., a styrene-based monomer, etc.). In the case of copolymerization, an amount of the one or more radically polymerizable other monomers may be 5 to 30 wt %, and specifically 10 to 20 wt %, based on the total weight of the acrylic rubbery polymer.

In an embodiment, in the acrylic graft copolymer, an average particle diameter of the acrylic rubbery polymer may be, for example 200 to 400 nm.

When the average particle diameter of the acrylic rubbery polymer is within the above range, mechanical properties such as impact resistance and tensile strength and appearance of the thermoplastic resin composition including the same may be improved.

In an embodiment, examples of the monomer and/or monomer mixture including the predetermined compound for forming the shell may include an alkyl (meth)acrylate, an aromatic vinyl compound, a vinyl cyanide compound, or a combination thereof.

Examples of the alkyl (meth)acrylate monomer for constituting the shell may include methyl (meth)acrylate, ethyl (meth)acrylate, butyl (meth)acrylate, glycidyl (meth)acrylate, 2-hydroxyethyl (meth)acrylate, cyclohexyl (meth)acrylate, or a combination thereof, but are not limited thereto.

Examples of the aromatic vinyl compound monomer for constituting the shell may include styrene, α-methylstyrene, p-methylstyrene, p-t-butylstyrene, 2,4-dimethylstyrene, chlorostyrene, vinyltoluene, vinylnaphthalene, or a combination thereof, but are not limited thereto.

The vinyl cyanide compound monomer for constituting the shell may include acrylonitrile, methacrylonitrile, fumaronitrile, or a combination thereof, but are not limited thereto.

In an embodiment, based on 100 wt % of the acrylic graft copolymer, an amount of the acrylic rubbery polymer may be 20 to 60 wt %, for example 30 to 60 wt %, or for example 40 to 60 wt %.

In an embodiment, the core may include an alkyl acrylate-styrene crosslinked copolymer, and the shell may be formed by graft polymerization of the alkyl (meth)acrylate to the core. Specifically, the acrylic graft copolymer may be one in which a methyl methacrylate monomer is graft-polymerized to a core made of a butyl acrylate-styrene crosslinked copolymer to form a shell.

In an embodiment, the core may include an alkyl acrylate crosslinked polymer, and the shell may be formed by graft polymerization of a monomer mixture including the aromatic vinyl compound and the vinyl cyanide compound to the core. In this case, the shell may be a copolymer of a monomer mixture including an aromatic vinyl compound and a vinyl cyanide compound in a weight ratio of 5:5 to 8:2, and specifically 5:5 to 7:3. Specifically, the acrylic graft copolymer may be a shell formed by graft polymerization of a monomer mixture of styrene and acrylonitrile to a core made of a butyl acrylate crosslinked polymer.

The acrylic graft copolymer may be included in an amount of greater than or equal to 10 wt %, for example greater than or equal to 15 wt %, and for example less than or equal to 40 wt %, for example less than or equal to 35 wt %, for example 10 to 40 wt %, or for example 15 to 35 wt % based on 100 wt % of the components (A) to (C).

When the acrylic graft copolymer is less than 10 wt %, an impact resistance of the thermoplastic resin composition may be reduced, and when it exceeds 40 wt %, mechanical strength and coloring properties of the thermoplastic resin composition may be reduced.

(B) Polyalkyl (meth)acrylate Resin

In an embodiment, the polyalkyl (meth)acrylate resin may improve coloring properties and scratch resistance of the thermoplastic resin composition.

The polyalkyl (meth)acrylate resin may be obtained by polymerizing a raw material monomer containing an alkyl (meth)acrylate by known polymerization methods such as suspension polymerization, bulk polymerization, and emulsion polymerization.

The alkyl (meth)acrylate, which is a monomer of the polyalkyl (meth)acrylate resin, may have a C1 to C10 alkyl group. Examples of the alkyl (meth)acrylate may include methyl (meth)acrylate, ethyl (meth)acrylate, butyl (meth) acrylate, glycidyl (meth)acrylate, 2-hydroxyethyl (meth) acrylate, cyclohexyl (meth)acrylate, or a combination thereof.

The component derived from the alkyl (meth)acrylate monomer may be included in at least 50 wt % and desirably 80 to 100 wt % based on 100 wt % of the total polyalkyl (meth)acrylate resin.

In an embodiment, the polyalkyl (meth)acrylate resin may include a polymethyl methacrylate resin. The polymethyl methacrylate resin may be a copolymer of methyl methacrylate and methyl acrylate. In this case, the polymethyl methacrylate resin may be a copolymer of a monomer mixture including 80 to 99 wt % of the methyl methacrylate and 1 to 20 wt % of the methyl acrylate.

On the other hand, the raw material monomer constituting the polyalkyl (meth)acrylate resin may optionally further include a vinyl-based monomer in addition to the alkyl (meth)acrylate monomer. Examples of the vinyl-based monomer may include an aromatic vinyl-based compound such as styrene, α-methyl styrene, and p-methyl styrene; a vinyl cyanide-based compound such as acrylonitrile and methacrylonitrile, and these may be used alone or in combination. However, an embodiment is not necessarily limited thereto, and the vinyl-based monomer may be omitted.

The polyalkyl (meth)acrylate resin may have a weight average molecular weight of 10,000 to 200,000 g/mol, or for example 15,000 to 150,000 g/mol. When the weight average molecular weight of the polyalkyl (meth)acrylate resin is within the above range, scratch resistance, processability, etc. may be excellently maintained.

In an embodiment, a glass transition temperature of the polyalkyl (meth)acrylate resin may be 100 to 150° C., and specifically 110 to 130° C.

In an embodiment, a refractive index of the polyalkyl (meth)acrylate resin may be 1.480 to 1.495, and specifically 1.485 to 1.490. When the above range is satisfied, a difference in refractive index between a continuous phase (matrix) and a dispersed phase (domain) may be minimized, and thus the thermoplastic resin composition may exhibit excellent coloring properties due to excellent transparency. The refractive index is a value measured using a spectroscopic ellipsometer, which is a refractive index measuring instrument of J. A. Woollam.

In an embodiment, the polyalkyl (meth)acrylate resin may be included in an amount of 30 to 60 wt % based on 100 wt % of the total amount of the components (A) to (C). When the content is less than 30 wt %, scratch resistance, coloring properties, weather resistance, and appearance characteristics may be deteriorated, and when is more than 60 wt %, impact resistance and processability may be reduced.

(C) N-(Substituted)maleimide-Acrylic Copolymer

In an embodiment, the N-(substituted)maleimide-acrylic copolymer may improve heat resistance of the thermoplastic resin composition. In addition, the N-(substituted)maleimide-acrylic copolymer exhibits excellent compatibility with the (B) polyalkyl (meth)acrylate resin due to the component derived from the acrylic monomer, and thus the thermoplastic resin composition including the same may exhibit improved coloring properties.

In an embodiment, the N-(substituted)maleimide-acrylic copolymer may be a copolymer of N-(substituted)maleimide and an acrylic monomer. Specifically, the N-(substituted) maleimide-acrylic copolymer may be a terpolymer of N-(substituted)maleimide-alkyl (meth)acrylate-aromatic vinyl compound.

The N-(substituted)maleimide-acrylic copolymer may include 10 to 40 wt % of a component derived from N-(substituted)maleimide, 20 to 60 wt % of a component derived from alkyl (meth)acrylate, and 10 to 40 wt % of a component derived from an aromatic vinyl compound.

When the component derived from N-(substituted)maleimide, the component derived from alkyl (meth)acrylate, and the component derived from styrene in the N-(substituted)maleimide-acrylic copolymer are included in the above ranges, respectively, the thermoplastic resin composition may exhibit improved impact resistance and heat resistance.

In an embodiment, examples of N-(substituted)maleimide among the monomers constituting the N-(substituted)maleimide-acrylic copolymer may include N-methylmaleimide, N-ethylmaleimide, N-cyclohexylmaleimide, N-phenylmaleimide, or a combination thereof.

In an embodiment, examples of the alkyl (meth)acrylate among the monomers constituting the N-(substituted)maleimide-acrylic copolymer may include methyl (meth)acrylate, ethyl (meth)acrylate, butyl (meth)acrylate, or a combination thereof, but are not limited thereto.

In an embodiment, examples of the aromatic vinyl compound among the monomers constituting the N-(substituted) maleimide-acrylic copolymer may include styrene, α-methyl styrene, p-t-butyl styrene, 2,4-dimethyl styrene, vinyl toluene, or a combination thereof, but are not limited thereto.

The N-(substituted)maleimide-acrylic copolymer may have a weight average molecular weight of 10,000 to 300,000 g/mol, for example 50,000 to 300,000 g/mol, or for example 100,000 to 300,000 g/mol. When the above range is satisfied, the thermoplastic resin composition including the same may exhibit improved heat resistance and impact resistance.

The N-(substituted)maleimide-acrylic copolymer may have a glass transition temperature of 120 to 160° C., or for example 130 to 150° C.

The N-(substituted)maleimide-acrylic copolymer may have a refractive index of 1.490 to 1.580, or for example 1.500 to 1.550.

The N-(substituted)maleimide-acrylic copolymer may be included in an amount of 10 to 40 wt %, or for example 15 to 35 wt %, based on 100 wt % of the components (A) to (C). When the content of the N-(substituted)maleimide-acrylic copolymer satisfies the aforementioned range, improved heat resistance may be secured without reducing the coloring properties of the thermoplastic resin composition according to an embodiment.

(D) Alkyl (meth)acrylate-Aromatic Vinyl Compound-Vinyl Cyanide Compound Copolymer The thermoplastic resin composition according to an embodiment may further include an alkyl (meth)acrylate-aromatic vinyl compound-vinyl cyanide compound copolymer in addition to the aforementioned components (A), (B), and (C).

The alkyl (meth)acrylate-aromatic vinyl compound-vinyl cyanide compound copolymer may be a copolymer of a monomer mixture including an alkyl (meth)acrylate, an aromatic vinyl compound, and a vinyl cyanide compound.

In an embodiment, examples of the alkyl (meth)acrylate may include methyl (meth)acrylate, ethyl (meth)acrylate, butyl (meth)acrylate, or a combination thereof, but are not limited thereto.

In an embodiment, examples of the aromatic vinyl compound may include styrene, α-methyl styrene, p-t-butyl styrene, 2,4-dimethyl styrene, vinyl toluene, or a combination thereof, but are not limited thereto.

In an embodiment, examples of the vinyl cyanide compound may include acrylonitrile, methacrylonitrile, fumaronitrile, or a combination thereof, but are not limited thereto.

Specifically, the alkyl (meth)acrylate-aromatic vinyl compound-vinyl cyanide compound copolymer may be a terpolymer of methyl methacrylate-styrene-acrylonitrile.

The methyl methacrylate-styrene-acrylonitrile copolymer may be a copolymer of a monomer mixture containing 60 to 80 wt % of methyl methacrylate, 10 to 30 wt % of styrene, and greater than 0 wt % and less than or equal to 10 wt % of acrylonitrile.

The alkyl (meth)acrylate-aromatic vinyl compound-vinyl cyanide compound copolymer may have a weight average molecular weight of 50,000 to 200,000 g/mol, for example 60,000 to 200,000 g/mol, for example 70,000 to 180,000 g/mol, for example 80,000 to 160,000 g/mol, for example 80,000 to 140,000 g/mol, for example 80,000 to 120,000 g/mol, or for example 90,000 to 120,000 g/mol.

When the weight average molecular weight of the alkyl (meth)acrylate-aromatic vinyl compound-vinyl cyanide compound copolymer is within the above range, a morphology between each component constituting the thermoplastic resin composition may be stably maintained without reducing a moldability of the thermoplastic resin composition in the shear rate region during injection molding.

The alkyl (meth)acrylate-aromatic vinyl compound-vinyl cyanide compound copolymer may be omitted in consideration of the balance of physical properties with other components, but when included, it may be included in an amount of greater than 0 wt %, for example greater than or equal to 1 wt %, for example greater than or equal to 2 wt %, for example greater than or equal to 3 wt %, for example greater than or equal to 4 wt %, for example greater than or equal to 5 wt %, and for example less than or equal to 20 wt %, for example less than or equal to 19 wt %, for example less than or equal to 18 wt %, for example less than or equal to 17 wt %, for example less than or equal to 16 wt %, for example less than or equal to 15 wt %, for example greater than 0 wt % and less than or equal to 20 wt %, for example 5 to 20 wt %, or for example 5 to 15 wt % based on 100 wt % of the total of the components (A) to (D).

When the alkyl (meth)acrylate-aromatic vinyl compound-vinyl cyanide compound copolymer satisfies the aforementioned range, each component constituting the thermoplastic resin composition, for example, improves compatibility with the acrylic graft copolymer, thereby exhibiting improved balance of physical properties.

(E) Other Additives

In addition to the components (A) to (D), the thermoplastic resin composition according to an embodiment may further include one or more additives in order to balance the physical properties under conditions capable of excellently maintaining other properties during processing or use, or according to the end use of the thermoplastic resin composition.

Specifically, the additives may include a flame retardant, a nucleating agent, a coupling agent, a filler, a plasticizer, an impact modifier, a lubricant, an antibacterial agent, a release agent, a heat stabilizer, an antioxidant, an inorganic additive, an ultraviolet stabilizer, an antistatic agent, a pigment, a dye, etc. and may be used alone or in combination of two or more.

These additives may be appropriately included within a range that does not impair the physical properties of the thermoplastic resin composition, and specifically, may be included in an amount of less than or equal to 20 parts by weight based on 100 parts by weight of the sum of components (A) to (D), but are not limited thereto.

Meanwhile, the thermoplastic resin composition according to an embodiment may be mixed with other resins or other rubber components and used together.

On the other hand, another embodiment provides a molded product manufactured from the thermoplastic resin composition according to an embodiment. The molded product may be manufactured by various methods known in the art, such as injection molding and extrusion molding, using the thermoplastic resin composition.

In an embodiment, the molded product may have a notched Izod impact strength of a ¼ inch-thick specimen measured according to ASTM D256 of greater than or equal to 4 kgf·cm/cm, or for example greater than or equal to 4.2 kgf·cm/cm.

In an embodiment, the molded product may have a Vicat softening temperature measured according to ASTM D1525 of greater than or equal to 101° C., or for example greater than or equal to 102° C.

In an embodiment, the molded product may have a lightness value (L*) measured according to ASTM E308 in a specular component excluded (SCE) method with respect to a black molded product of less than or equal to 3, for example less than or equal to 2.9, for example less than or equal to 2.8, for example less than or equal to 2.7, or for example less than or equal to 2.6. The lightness value is a value in case that a predetermined amount, for example, 0.5 to 1 part by weight based on 100 parts by weight of the sum of components (A) to (D) of a black dye and/or a black pigment is added to the aforementioned thermoplastic resin composition to manufacture a molded product, and the lower the lightness value, the better the blackness (coloring properties).

As such, the molded product manufactured from the thermoplastic resin composition according to an embodiment exhibits excellent impact resistance, heat resistance, and coloring properties, the molded product may be advantageously used for various electric and electronic parts, construction materials, leisure products, automobile parts, etc. which are used outdoors. Particularly, the molded products may be used as exterior materials for automobiles capable of non-painting. However, the use of the molded product is not limited thereto.

Hereinafter, the present invention is illustrated in more detail with reference to examples. These examples, however, are not in any sense to be interpreted as limiting the scope of the invention.

Examples 1 to 5 and Comparative Examples 1 to 6

Pellet-type thermoplastic resin compositions were prepared by mixing 0.5 parts by weight of a black dye for facilitating evaluation of coloring properties, and 0.5 parts by weight of other additives such as antioxidants and lubricants in a conventional mixer, and then extruding the obtained mixture with a twin-screw extruder having L/D=29 and φ=45 mm at a barrel temperature of 250° C.

The prepared pellets were dried in a dehumidifying drier at 80° C. for 4 hours before injection molding, and then made into specimens for measuring properties and coloring properties with a 6 oz injection molding machine by setting a cylinder temperature at 250° C. and a mold temperature at 60° C. The measured properties are shown in Table 2.

TABLE 1

| Components | | | Examples | | | | | Comparative Examples | | | | | |
|---|---|---|---|---|---|---|---|---|---|---|---|---|---|
| | | | 1 | 2 | 3 | 4 | 5 | 1 | 2 | 3 | 4 | 5 | 6 |
| (A) | (A-1) | wt % | 20 | 30 | 30 | — | — | 30 | 30 | — | — | — | — |
| | (A-2) | wt % | — | — | — | 30 | 30 | — | — | 30 | 30 | 30 | 30 |
| | (B) | wt % | 60 | 50 | 40 | 40 | 30 | 70 | 20 | 70 | 20 | — | 50 |
| | (C) | wt % | 20 | 20 | 30 | 30 | 30 | — | 50 | — | 50 | — | — |
| | (C') | wt % | — | — | — | — | — | — | — | — | — | — | 20 |
| | (D) | wt % | — | — | — | — | 10 | — | — | — | — | 70 | — |

In Table 1, all components are expressed in wt %, and black dye and other additives such as an antioxidant and a lubricant commonly used are not indicated.

(A) Acrylic Graft Copolymer
(A-1) Methyl Methacrylate-Acrylate-Styrene Graft Copolymer A methyl methacrylate-acrylate-styrene graft copolymer containing about 60 wt % of a butyl acrylate-styrene crosslinked copolymer core having an average particle diameter of about 250 nm, wherein methyl methacrylate is graft-polymerized on the core to form a shell was used (Kaneka Corporation).

(A-2) Acrylonitrile-Styrene-Acrylate Graft Copolymer

An acrylonitrile-styrene-acrylate graft copolymer containing about 55 wt % of a butyl acrylate crosslinked polymer core having an average particle diameter of about 350 nm, and styrene and acrylonitrile are graft-polymerized to the core in a weight ratio of about 7:3 to form a shell was used (Lotte Advanced Materials Co., Ltd.).

(B) Polyalkyl (meth)acrylate Resin

A poly(methyl methacrylate) resin having a weight average molecular weight of about 100,000 g/mol was used (Lotte Advanced Materials Co., Ltd.).

(C) N-(Substituted)maleimide-Acrylic Copolymer

An N-phenylmaleimide-methyl methacrylate-styrene copolymer having a refractive index of about 1.520, a weight average molecular weight of about 200,000 g/mol, and a glass transition temperature (Tg) of about 140° C. was used (Nippon Shokubai Co., Ltd.).

(C') Styrene-Methyl Methacrylate-Maleic Anhydride Copolymer

A styrene-methyl methacrylate-maleic anhydride copolymer having a refractive index of about 1.570 and prepared by copolymerizing a monomer mixture including about 70 wt % of styrene, about 8 wt % of methyl methacrylate, and about 22 wt % of maleic anhydride was used (Denka Company Limited).

(D) Alkyl (meth)acrylate-Aromatic Vinyl Compound-Vinyl Cyanide Compound Copolymer A methyl methacrylate-styrene-acrylonitrile copolymer having a weight average molecular weight of about 120,000 g/mol and prepared by copolymerizing a monomer mixture including about 21 wt % of styrene, about 74 wt % of methyl methacrylate, and about 5 wt % of acrylonitrile was used (Lotte Advanced Materials Co., Ltd.).

Evaluation

The impact resistance, heat resistance, and coloring properties of the specimens for evaluating properties and coloring properties according to Examples 1 to 5 and Comparative Examples 1 to 6 were measured by the following evaluation method, and are shown in Table 2.

1. Impact Resistance (Unit: Kgf·cm/cm)

Notched Izod impact strength was measured according to ASTM D256 standard with respect to notched ¼" inch-thick specimens.

2. Heat Resistance (Unit: ° C.)

Vicat softening temperature (VST) was measured according to ASTM D1525.

3. Coloring Properties

Using a Konica-Minolta CM-3700d colorimeter, lightness (L*) values were measured with respect to specimens for measuring coloring properties of width×length×thickness of 90 mm×50 mm×2.5 mm in a specular component excluded (SCE) method according to ASTM E308.

The lower the lightness, the better the blackness, and thus it was evaluated that the coloring properties were excellent.

TABLE 2

| Components | Examples | | | | | Comparative Examples | | | | | |
|---|---|---|---|---|---|---|---|---|---|---|---|
| | 1 | 2 | 3 | 4 | 5 | 1 | 2 | 3 | 4 | 5 | 6 |
| Izod impact strength | 4.3 | 5.1 | 4.8 | 6.2 | 6.2 | 4.5 | 2.8 | 6.1 | 3.5 | 6.5 | 6.5 |

TABLE 2-continued

| Components | Examples | | | | | Comparative Examples | | | | | |
|---|---|---|---|---|---|---|---|---|---|---|---|
| | 1 | 2 | 3 | 4 | 5 | 1 | 2 | 3 | 4 | 5 | 6 |
| VST | 103 | 102 | 105 | 105 | 104 | 97 | 108 | 97 | 107 | 96 | 100 |
| L* | 1.8 | 2.1 | 2.3 | 2.5 | 2.1 | 1.0 | 3.3 | 1.8 | 5.2 | 1.6 | 1.8 |

From the results of Tables 1 and 2, the thermoplastic resin composition including the acrylic graft copolymer, polyalkyl (meth)acrylate resin, and N-(substituted)maleimide-acrylic copolymer in the above-described range and a molded product manufactured therefrom exhibit excellent impact resistance, heat resistance, and coloring properties.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

The invention claimed is:

1. A thermoplastic resin composition, comprising
  (A) 10 to 40 wt % of an acrylic graft copolymer that comprises a core comprising an acrylic rubbery polymer, and a shell formed by graft polymerization of a monomer to the core, the monomer including an aromatic vinyl compound and a vinyl cyanide compound, wherein the aromatic vinyl compound and the vinyl cyanide compound are in a weight ratio of 5:5 to 8:2;
  (B) 30 to 60 wt % of a polyalkyl (meth)acrylate resin; and
  (C) 10 to 40 wt % of an N-(substituted) maleimide-acrylic copolymer,
  wherein the acrylic rubbery polymer has an average particle diameter of 200 to 400 nm.

2. The thermoplastic resin composition of claim 1, wherein
  the acrylic rubbery polymer is included in an amount of 20 to 60 wt % based on 100 wt % of the (A) acrylic graft copolymer.

3. The thermoplastic resin composition of claim 1, wherein
  the acrylic rubbery polymer comprises a crosslinked polymer of an alkyl acrylate monomer comprising methyl acrylate, ethyl acrylate, butyl acrylate, 2-ethylhexyl acrylate, hexyl acrylate, or a combination thereof, a crosslinked copolymer of the alkyl acrylate monomer and a styrene monomer, or a combination thereof.

4. The thermoplastic resin composition of claim 1, wherein
  the core comprises an alkyl acrylate-styrene-based crosslinked copolymer, and
  the shell is formed by graft polymerization of the monomer including the alkyl (meth)acrylate to the core.

5. The thermoplastic resin composition of claim 1, wherein
  the (B) polyalkyl (meth)acrylate resin has a weight average molecular weight of 10,000 to 200,000 g/mol.

6. The thermoplastic resin composition of claim 1, wherein
  the (B) polyalkyl (meth)acrylate resin is polymer of a monomer including methyl (meth)acrylate, ethyl (meth)acrylate, butyl (meth)acrylate, glycidyl (meth)

acrylate, 2-hydroxyethyl (meth)acrylate, cyclohexyl (meth)acrylate, or a combination thereof.

7. The thermoplastic resin composition of claim 1, wherein
  the (C)N-(substituted) maleimide-acrylic copolymer has a glass transition temperature of 120 to 160° C.

8. The thermoplastic resin composition of claim 1, wherein
  the (C)N-(substituted) maleimide-acrylic copolymer has a refractive index of 1.490 to 1.580.

9. The thermoplastic resin composition of claim 1, wherein
  the (C)N-(substituted) maleimide-acrylic copolymer is a terpolymer of N-(substituted) maleimide-alkyl (meth)acrylate-aromatic vinyl compound.

10. The thermoplastic resin composition of claim 9, wherein
  the N-(substituted) maleimide comprises N-methylmaleimide, N-ethylmaleimide, N-cyclohexylmaleimide, N-phenylmaleimide, or a combination thereof.

11. The thermoplastic resin composition of claim 9, wherein
  the (C)N-(substituted) maleimide-acrylic copolymer has a weight average molecular weight of 10,000 to 300,000 g/mol.

12. The thermoplastic resin composition of claim 1, wherein
  the thermoplastic resin composition further comprises (D) alkyl (meth)acrylate-aromatic vinyl compound-vinyl cyanide compound copolymer in an amount of greater than 0 wt % and less than or equal to 20 wt %.

13. The thermoplastic resin composition of claim 1, further comprising
  an additive comprising a flame retardant, a nucleating agent, a coupling agent, a filler, a plasticizer, a lubricant, an antibacterial agent, a release agent, a heat stabilizer, an antioxidant, an inorganic additive, an ultraviolet stabilizer, an antistatic agent, a pigment, and/or a dye.

14. A molded product manufactured from the thermoplastic resin composition of claim 1.

15. The molded product of claim 14, wherein the molded product has a notched Izod impact strength of a ¼ inch-thick specimen measured according to ASTM D256 of greater than or equal to 4 kgf cm/cm.

16. The molded product of claim 14, wherein
  the molded product has a Vicat softening temperature measured according to ASTM D1525 of greater than or equal to 101° C.

17. The molded product of claim 14, wherein
  the molded product has a lightness value (L*) measured according to ASTM E308 in a specular component excluded (SCE) method with respect to a black molded product of less than or equal to 3.

\* \* \* \* \*